United States Patent
Li et al.

(10) Patent No.: US 11,533,538 B2
(45) Date of Patent: Dec. 20, 2022

(54) STREAMING EVENT CONTENT BASED FILTERING

(71) Applicant: salesforce.com, inc., San Francisco, CA (US)

(72) Inventors: Dan Li, San Ramon, CA (US);
Lawrence Eugenio McAlpin, Bloomington, IN (US); Brian St. Clair, Lutz, FL (US); Alex S. Warshavsky, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/678,962

(22) Filed: Nov. 8, 2019

(65) Prior Publication Data
US 2021/0144440 A1 May 13, 2021

(51) Int. Cl.
| | |
|---|---|
| *H04N 21/239* | (2011.01) |
| *H04N 21/2543* | (2011.01) |
| *H04N 21/262* | (2011.01) |
| *H04N 21/454* | (2011.01) |
| *G06F 16/735* | (2019.01) |
| *H04N 21/2668* | (2011.01) |
| *G06F 16/78* | (2019.01) |
| *H04N 21/258* | (2011.01) |
| *G06F 9/54* | (2006.01) |
| *H04L 65/61* | (2022.01) |

(52) U.S. Cl.
CPC ......... *H04N 21/4542* (2013.01); *G06F 9/542* (2013.01); *G06F 16/735* (2019.01); *G06F 16/78* (2019.01); *H04L 65/61* (2022.05); *H04N 21/25891* (2013.01); *H04N 21/2668* (2013.01); *H04N 21/26208* (2013.01)

(58) Field of Classification Search
None
See application file for complete search history.

(56) References Cited

U.S. PATENT DOCUMENTS

| | | | |
|---|---|---|---|
| 5,557,798 A * | 9/1996 | Skeen | G06F 9/542 709/215 |
| 7,730,478 B2 | 6/2010 | Weissman | |
| 9,628,412 B2 | 4/2017 | St. Clair et al. | |
| 10,037,316 B2 | 7/2018 | Mencke et al. | |
| 10,298,582 B2 | 5/2019 | Syomichev et al. | |
| 2012/0096476 A1* | 4/2012 | Lee | G06F 9/542 719/318 |
| 2014/0366047 A1* | 12/2014 | Thomas | H04N 21/472 725/5 |
| 2018/0176174 A1* | 6/2018 | Sherman | H04L 67/1014 |
| 2019/0392114 A1* | 12/2019 | Cholas | H04L 63/08 |

OTHER PUBLICATIONS

U.S. Appl. No. 16/678,946, Pending.

* cited by examiner

*Primary Examiner* — Brian T Pendleton
*Assistant Examiner* — Jean D Saint Cyr
(74) *Attorney, Agent, or Firm* — Kwan & Olynick LLP

(57) ABSTRACT

A method of per subscription event filtering is provided for an event recordation and distribution system. The method includes receiving an event from the event recordation and distribution system, determining that an event consumer that is a subscriber of an event stream of the event has specified filter logic for the event stream, and forwarding the event to an event consumer in response to the event meeting requirements of the specified filter logic.

20 Claims, 5 Drawing Sheets

STREAMING EVENT CONTENT BASED FILTERING

TECHNICAL FIELD

One or more implementations relate to the field of event consumption; and more specifically, to the filtering of events published by an event recordation and distribution system.

BACKGROUND ART

Web applications that serve and manage millions of Internet users, such as Facebook™, Instagram™, Twitter™, banking websites, as well as online retail shops, such as Amazon.com™ or eBay™ are faced with the challenge of ingesting high volumes of data as fast as possible so that the end users can be provided with a real-time experience.

The "Internet of Things" (IoT) is another major contributor to big data, supplying huge volumes of data. IoT has become a pervasive presence in the environment, with a variety of things/objects that communicate via wireless and wired connections to interact with each other and cooperate with other things/objects to create new applications/services. These applications/services exist in smart cities (regions), smart cars and mobility, smart homes and assisted living, smart industries, public safety, energy and environmental protection, agriculture and tourism. A massive quantity of data gets persisted from the millions of IoT devices and web applications.

Event recordation and distribution systems can be utilized to manage data distribution in these types of systems. In current event recordation and distribution systems, a high volume of events is published by multiple event producers and then delivered to multiple consumers. The event recordation and distribution system is a large scale, asynchronous, distributed system where failures are inevitable due to network failures, equipment failures and similar issues. Event publishing is asynchronous. Event recordation and distribution systems can handle a large number of events. The streaming of these events to event consumers can consume significant bandwidth and resources. Event consumers can specify a topic to subscribe to, but even with specific topics identified the amount of events being streamed to the event consumers is large. While an event consumer may be interested in some events in an event stream of a topic, not all events are relevant to the event consumer.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for enabling event consumers to provide a content based filter when subscribing to event streams (e.g., platform events or change events). The content based filter is stored and managed at the event recordation and distribution system, which applies the content based filter before delivery of events. In this manner, the event recordation and distribution system will only deliver events which match the provided content based filter, events which do not match the content based filter won't be delivered to the event consumers, thereby reducing resource consumption for event publishing.

Exemplary System

Figure 1:
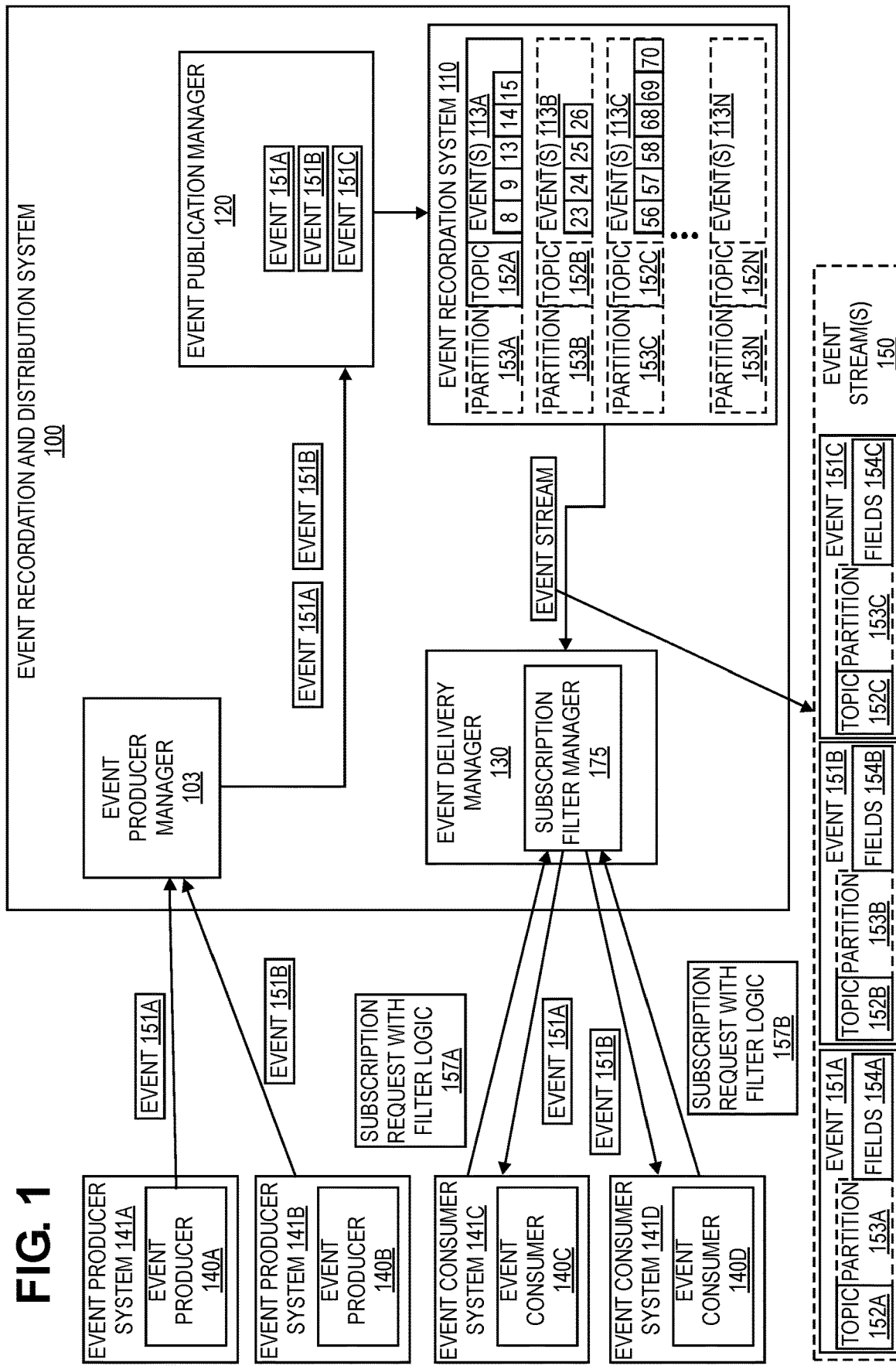
FIG. 1 is a block diagram illustrating a content based filtering system for an event recordation and distribution system according to some example implementations.

FIG. 1 is a block diagram illustrating a content based filtering system for an event recordation and distribution system 100 according to some example implementations. Event recordation and distribution system 100 (which may alternatively be referred to as the system 100) includes an event recordation system 110, an event publication manager 120, an event delivery manager 130, a set of one or more event consumer and/or producer systems 141A-D, an event producer manager 103, and similar components.

An event (e.g., 151A-151C) in the system 100 is an identifiable unit of data that conveys information about operations that occur in a system (e.g., measurements recorded in an IoT device, actions performed by a user of a social networking system, failures of an operation or a system, etc.). The operations can be user-generated or system-generated. In some implementations, an event is associated with a topic. A topic can be information or details on the event that can be used to group one or more events, to publish the events, and to deliver the events to event consumers 140A-D. In some implementations, an event can also be associated with a partition. The partition can be information on the event, which can be used to group multiple events. The partition and topic can be used to group events with the same topic and partition and can be used to transmit these events to one or more event consumers 140A-C that requests them based on the partition and/or topic they are associated with. In a non-limiting example of a multi-tenant platform, the partition can be a tenant identifier (which can also be referred to as an organization identifier (org ID)) where each one of the tenant identifiers uniquely identifies a tenant within the system. The topic can be a word or alphanumerical value added to an event generated in the system. Other examples of topics or partitions can be contemplated without departing from the scope of the present implementations.

In some implementations an event is associated with a topic when it is generated by an event producer 140A-D. In some implementations, the event is also associated with a partition. The topic and/or partition can be added to the event as an additional field to the other data included in the event. The topic and partition can be used as a schema to store and retrieve the event in an event recordation system 110, when this event recordation system 110 is a database.

Each event is published through execution of a transaction that is asynchronous with execution of other transactions for publishing subsequent events of a given topic. Each transaction commits the event (i.e., stores the event) in an order that is independent of the order the events are received or assigned to a topic. Thus, the order by which events are stored in the event recordation system 110 can be different from an expected received order. After events are stored in the event recordation system 110, the event delivery manager 130, as described further herein below, manages a set of event streams 150 that distribute the events to the subscribers according to the topic and/or partition of the events and subscribers.

The implementations described herein propose a mechanism for filtering events within the event recordation and distribution system 100 that enable event consumers 140A-D to be provided events that meet a specified content based filter rather than all of the events associated with a subscribed topic and/or partition. The content based filters are provided by an event consumer upon subscribing to a topic (i.e., an event stream) and applied by a subscription filter manager 175 or similar component of an event delivery manager 130.

In one example implementation, a first event 151A of a first topic is generated by an event producer 140A that is received by the event recordation and distribution system 100. Each event is received at an event producer manager 103 where initial processing of the event is implemented such as associating the event 151A with metadata and acknowledging the receipt of the event 151A to the event producer 140A. The events can be stored in an event buffer to await further processing or directly forwarded to the event publication manager 120. Each event is then processed by the event publication manager 120. The event publication manager 120 can process each event in multiple stages before recording the event in the event recordation system 110.

The event delivery manager 130 generates event streams according to topics and/or partitions that are to be sent to each subscribing event consumer system 141C and 141D. The subscribing event consumers 140C and 140D can provide a content based filter to the event delivery manager 130 at the time of subscription. In some implementations, the event consumer 140C and 140D can provide updated or new content based subscriptions after the initial subscription. A subscription filter manager 175 can implement the subscription and filter provisioning process as well as the filtering of the vents based on the content based filters as described further with relation to FIGS. 2A and 2B. In some implementations, these functions can be implemented by separate components.

The above implementations are advantageous as compared to some conventional systems. For example, a first conventional system processes event publication transactions, but all events, including those not relevant to the event producers 140C and 140 D are delivered to the event consumer systems 141C and 141D, respectively. The first conventional system therefore utilizes greater bandwidth for event delivery and the event consumers 140C and 140D use greater resources to locally filter events.

Additional Details About the Event Recordation and Distribution System 100

The event recordation and distribution system 100 can receive a stream of events, e.g. multiple events 151A-DC and is operative to store the events in the event recordation system (e.g., 110) and enable consumption/delivery of the events to a set of event consumers/producers 140A-D at a set of event consumer/producer systems 141A-D. In some implementations, the stream of events 150 can be received by an event producer manager 103 that manages the receipt of streams generated by one or more event producers 140A and 140B (e.g., IoT devices, and/or application data source(s)). The application data sources may include various applications running on software-as-a-service (SaaS), platform-as-a-service (PaaS) and/or infrastructure-as-a-service (IaaS) infrastructures. The applications can also include other types of distributed or non-distributed applications that produce streams of events.

Examples of events include device logs, clicks on links, impressions of recommendations, numbers of logins on a particular client, server logs, user's identities (sometimes referred to as user handles or user IDs and other times the users' actual names), content posted by a user to a respective feed on a social networking service, social graph data, metadata including whether comments are posted in reply to a prior posting, another event, or an article, and so forth. Events can be in a semi-structured data format like a JSON (JavaScript Option Notation), BSON (Binary JSON), XML, Protobuf, Avro or Thrift object, which present string fields (or columns) and corresponding values of potentially different types like numbers, strings, arrays, objects, etc. JSON objects can be nested and the fields can be multi-valued, e.g., arrays, nested arrays, etc., in other implementations.

In some implementations, terabytes of events per hour arrive for processing. In some implementations, the events are published to the recordation and distribution system 100 to be stored in one of multiple event recordation systems 119 and intended to be consumed, in real-time, pseudo-real time, or on-demand, by one or more event consumers such as event consumers 140C and 140D. The event recordation and distribution system 100 can service any number of event producers 140A and 140B and event consumers 140C and 140D implemented by event consumer/producer system 141A-D. A set of two event producers 140A and 140B and event consumers 140C and 140D are presented in the illustration by way of example and not limitation.

Each stream of events can include multiple events. For example, a stream 150 can include events 151A-C. Each event from the stream includes a topic, and one or more additional fields. The event may also include a partition. For example, the partition can include a tenant identifier. The additional fields can be referred to as a payload of the event. For example, an event can have a topic, an optional partition, and one or more additional fields. Events of a stream may have one of multiple partitions and/or topics. Some events may share the same partition and/or the same topic.

In some implementations, where a partition refers to a tenant identifier in a multi-tenant environment, all events received with that same partition belong to the same tenant. The topic can be an alphanumerical value entered by a user of the multi-tenant system to be associated with a record, an account, a task, etc., some events of a stream may have the same topic. The topics allow the event consumers to request the events stored in the event recordation system 110. While the events are described as having a respective topic and partition, in some implementations, each event may only have a topic. The partition is an optional field that can be omitted in some implementations. For example, when the partition represents the identification of a tenant, when operating in a single tenant system, the events may not have a tenant identifier and therefore only a topic can be included in an event to enable event consumers to receive the events based on the topic.

Each instance from the instances of event producer/consumers 140A-D are a processes that are being executed on one or more servers of a distributed computing platform referred to here as event consumer/producer systems 141A-

D. The process of each event consumer/producer 140A-D is the actual execution of program code including instructions that form a computer program. Several instances may be associated with the same program code. For example, in a multi-tenant system, a first event consumer 140C is dedicated to a first tenant and a second event consumer 140D may execute the same code and be dedicated to a second tenant that is different from the first tenant.

The event consumers 140C and 140D are operative to request and consume events stored in the event recordation systems 110 based on the topic (and/or the partitions). The event consumers 140C and 140D can be used for gaining insight on the data embedded in the events, for gaining insight on the operations and actions performed in the applications and/or the IoT devices, and/or for gaining insight on the environment controlled or measured by the IoT devices and/or applications. In some implementations, the instances of the event consumers 140C and 140D can request to obtain the events and process the events to perform one or more of audit, debug and support, forensic and compliance, and/or analytics of the applications and IoT devices. In some implementations, the event consumers 140C and 140D may be implemented in a distributed computing environment, where multiple instances of event consumers can be run on one or more servers. The event consumers 140C and 140D can be owned and operated by a same entity such as a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). Alternatively, the one or more event consumers can be operated by multiple entities such as different customers of an event recordation and distribution service.

The event recordation and distribution system 100 may include an event publication manager 120 that is operative to handle how and where the events are recorded/stored in one or more of the event recordation systems such as event recordation system 110. In some implementations, the event publication manager 120 may be external to the event distribution and recordation system 100. In other implementations, the event publication manager 120 may be part of the event distribution and recordation system 100. The event producer manager 103 receives events from the event producers 140A and 140B that are prepared and forwarded to the publication manager 120 to ensure that each event 151A-C is successfully processed and recorded in the event recordation system 110. For example, upon receipt of the events 151A, 151B and 151C, the event publication manager 120 organizes and stores these in the event recordation system according to topic and/or partition in the order they are received.

In some implementations, the publishing order is defined when a publishing transaction is initiated. The completion of the execution of the publishing transaction results in the event being stored in the event recordation system 110.

In the event recordation system 110 the events are grouped with an associated topic (and in some implementations based on a topic and a partition). One of ordinary skill in the art would understand that each event stored may include additional fields not illustrated. The event recordation system 110 includes a first set of events 113A stored for a first topic 152A, and events 113N stored for topic 152N. Any number of topics can be included and events for these topics stored in the event recordation system 110 without departing from the scope of the implementations described herein.

In some implementations, one or more event streams are stored in the event recordation system 110 with each event stream being defined with a different topic 152A-N and optionally partition (e.g., partitions 153A and 153B). A set of events is associated with each topic (e.g., events 8, 9, 13, 14 and 15 are associated with topic 152A). An event delivery manager 130 published an event stream 150 for each event with a shared topic and optionally partition.

In some implementations, the event recordation system 110 may be one of several types of event recordation systems. For example, event recordation system 110 may be a messaging system implemented based on a publish/subscribe platform, or a long-term storage non-relational database. Alternatively, other types of data structure systems can be used for implementing the event recordation system 110 such as relational databases, etc. In some implementations, the event recordation system 110 is a short-term storage medium, where the events have a time to leave associated with them after which they expire, and they are deleted from the system.

The system may further include an event delivery manager 130 that is coupled with the event recordation system 110 and is operative to receive requests from the event consumers 140C and 140D for events associated with an identified topic (or a topic and partition) (i.e., a subscription request) and responds to these requests by transmitting events to the event consumers. The event consumers 140C and 140D can provide filter logic or similar content based filters with the subscription requests 157A and 157B. The tracking and handling of the filter logic or content based filter information can be managed by a subscription filter manager 175 or similar component of the event delivery manager 130 or the event recordation and distribution system 100. The functions of the subscription handling and filtering of events is described further herein with relation to FIGS. 2A and 2B.

The event delivery manager 130 is operative to receive batches of events for one or more topics from the event recordation system 110 and delivers the events without any discontinuities to the event consumers 140. In some implementations, the receipt of a batch of events for a given topic (e.g., topic 152A, topic 152N, or status topics 172A-N) is a result of the subscription request transmitted from an event consumer (e.g., 140C and 140D) to the event recordation system 110. The subscription request is sent through the event delivery manager 130. In some implementations, transmitting a subscription request includes subscribing to a topic. In some implementations, each event consumer is operative to subscribe to one or more topics. Alternatively, each event consumer can subscribe to a single topic. The event delivery manager 130 and the components thereof are operative to manage the subscription and delivery of the events based on the received subscription requests and any applicable filters. In some implementations, upon receipt of a request from an event consumer (e.g., a subscription to a topic), the event delivery manager 130 transmits the request to the event recordation system 110. For example, the event delivery manager 130 can in turn subscribe to the topic to receive the events prior to their delivery to the event consumer. The subscription can be made at an earlier time (prior to the receipt of the events) and events are continuously transmitted to the event delivery manager 130 based on this earlier subscription. The subscription can be a new subscription and only new events are transmitted.

Figure 2A:
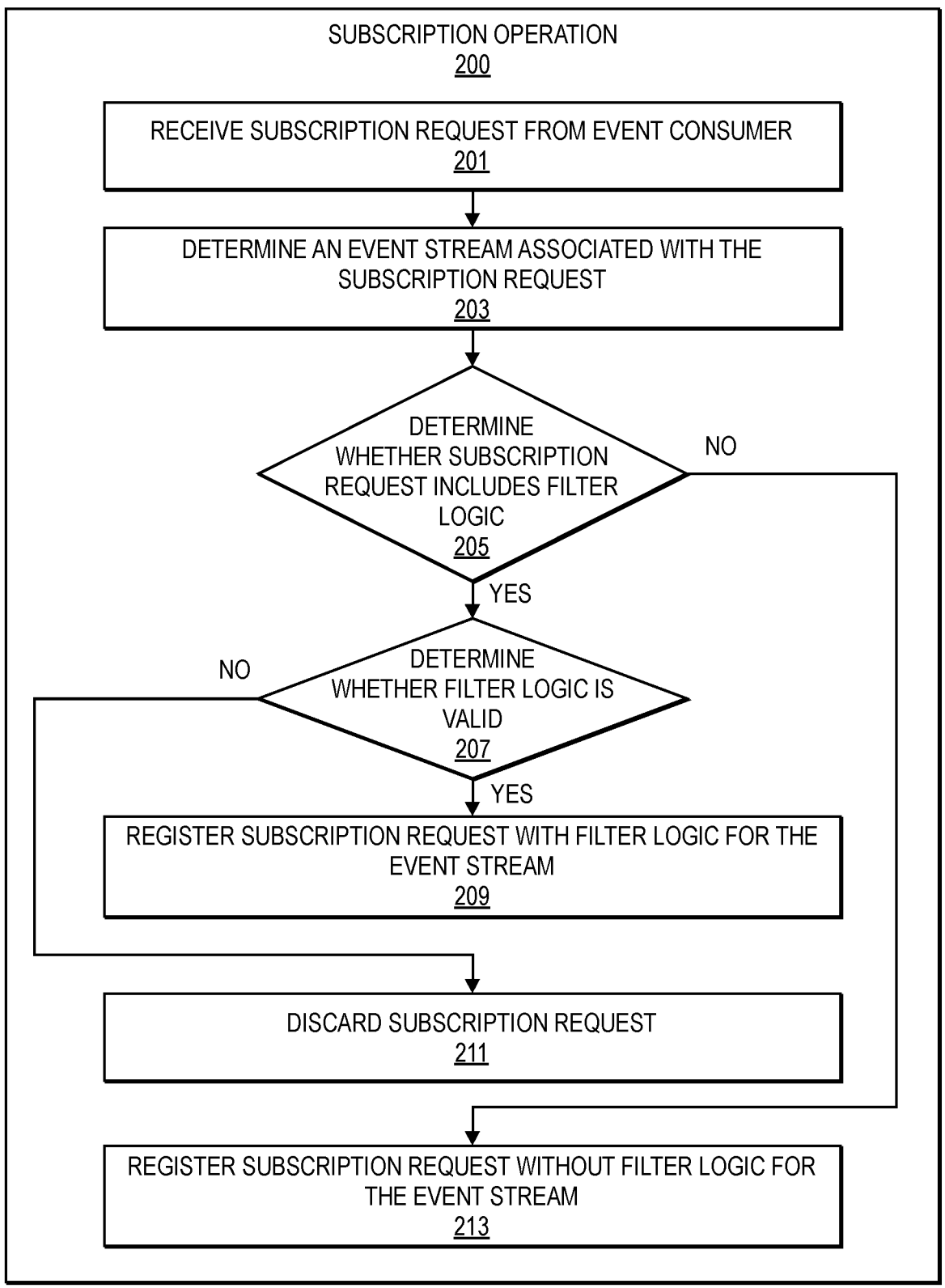
FIG. 2A is a flow diagram illustrating the operation of subscription operation according to some example implementations.

FIG. 2A is a flow diagram illustrating the operation of a subscription management operation according to some example implementations (Block 200). The event delivery manager or a component thereof such as a subscription manager can implement the process. The subscription manager is used herein as an example implementation for sake of clarity. The process beings with the subscription manager receiving a subscription request from an event consumer (Block 201). The subscription request can identify a topic and/or partition and similar information to enable the identification of an event stream to be sent to the event consumer (Block 203). Events can be delivered individually or in batches after they are recorded in the event recordation system. The event delivery manager can subscribe to event streams (i.e., topics and or partitions) in response to receiving subscription requests for these topics and/or partitions with the appropriate event recordation system where multiple event recordation systems are available. (Block 203).

The received subscription request is checked to determine whether filter information has been provided with the subscription request (Block 205). The filter information can be a string, Boolean expression, list, table, or similar information having any complexity or using any language that can be applied to identify events that are to be filtered (i.e., not delivered) to the requesting event consumer. In some implementations, the filter information can instead be structured to identify criteria for events in a subscribed event stream that are to be delivered with other events being blocked. If no filter information is provided with a subscription request, then the subscription manager can register the subscription request for the event consumer without tracking filter information (Block 213).

If filter information is provided, then the filter information can be processed to determine whether the logic or language of the filter information is valid and can be implemented using any validity, syntactic, or semantic checking algorithm (Block 207). If the filter logic is not successfully validated, then the subscription request can be discarded (Block 211). In some implementations, the filter information can be discarded while the subscription request is registered. In either case, an error message can be generated to notify the event consumer of the failed validation of the filter logic in some implementations.

If the filter logic in the filter information is successfully validated, then the filter information and subscription requested can be registered (Block 209). This can cause the subscription manager to track the filter information on a per subscription basis to be implemented during event delivery processing. The event stream subscription and filter information can be tracked in any type of data structure.

Figure 2B:
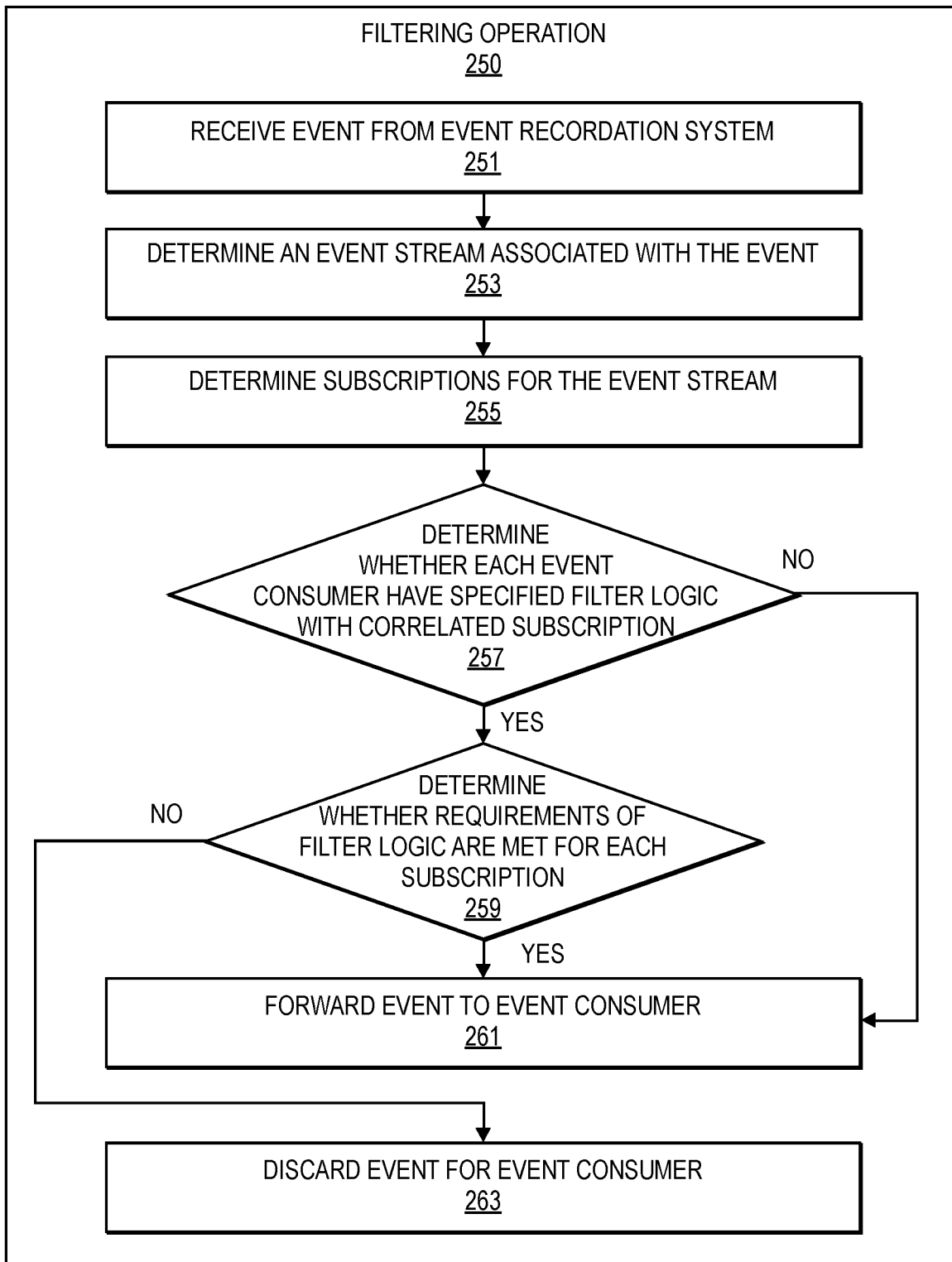
FIG. 2B is a flow diagram illustrating the operation of a filtering operation according to some example implementations.

FIG. 2B is a flow diagram illustrating the operation of an event filtering process according to some example implementations. The filtering process can be implemented by a subscription manager or similar component of an event delivery manager. The event filtering process applies filter logic and similar filter information on a per subscription basis to reduce a number of events being distributed to event consumers. The process can be triggered by an event being received from the event recordation system (Block 251). As each event is stored in the event recordation system, the events can be distributed to event delivery managers to be distributed to event consumers. The event delivery managers can subscribe to event streams for topics and/or partitions that the event delivery manager has received a subscription request for from event consumers. As each event is received by the event delivery manager it is associated with an event stream based on its topic and/or partition (Block 253). An event can be associated with multiple event streams in some cases. The subscription manager can determine whether the event streams associated with the received event have any subscriptions that are registered for event consumers (Block 255). While the implementations herein are described with respect to a single event consumer receiving events for a given topic, in other implementations multiple event consumers may receive events of a topic. These events can be duplicated by the event delivery manager to be transmitted to multiple event consumers.

The process determines for each subscription correlated with each event consumer, whether filter logic or similar filter information has been registered (Block 257). If not filter logic or other filter information has been provided and associated with a subscription, then the event is forwarded to the respective event consumers that subscribe to the event streams for the event (Block 261).

If filter logic or similar filter information has been provided, then the filter logic is applied to determine if the criteria of the filter logic is met by the event (Block 259). If the criteria for the filter logic is met indicating that the subscription does want to receive the event, then the event is forwarded to the subscribing event consumer for the event stream (Block 261). If the filter logic is not met indicating that the subscription does not want to receive the event, then the event is discarded for the respective subscription and is not forwarded as part of an event stream for that subscription (Block 263).

The example implementations of the present application describe a mechanism for event filtering within an event recordation and distribution system that reduces resource utilization and bandwidth utilization for the event recordation and distribution system.

Example Implementation

Figure 3:
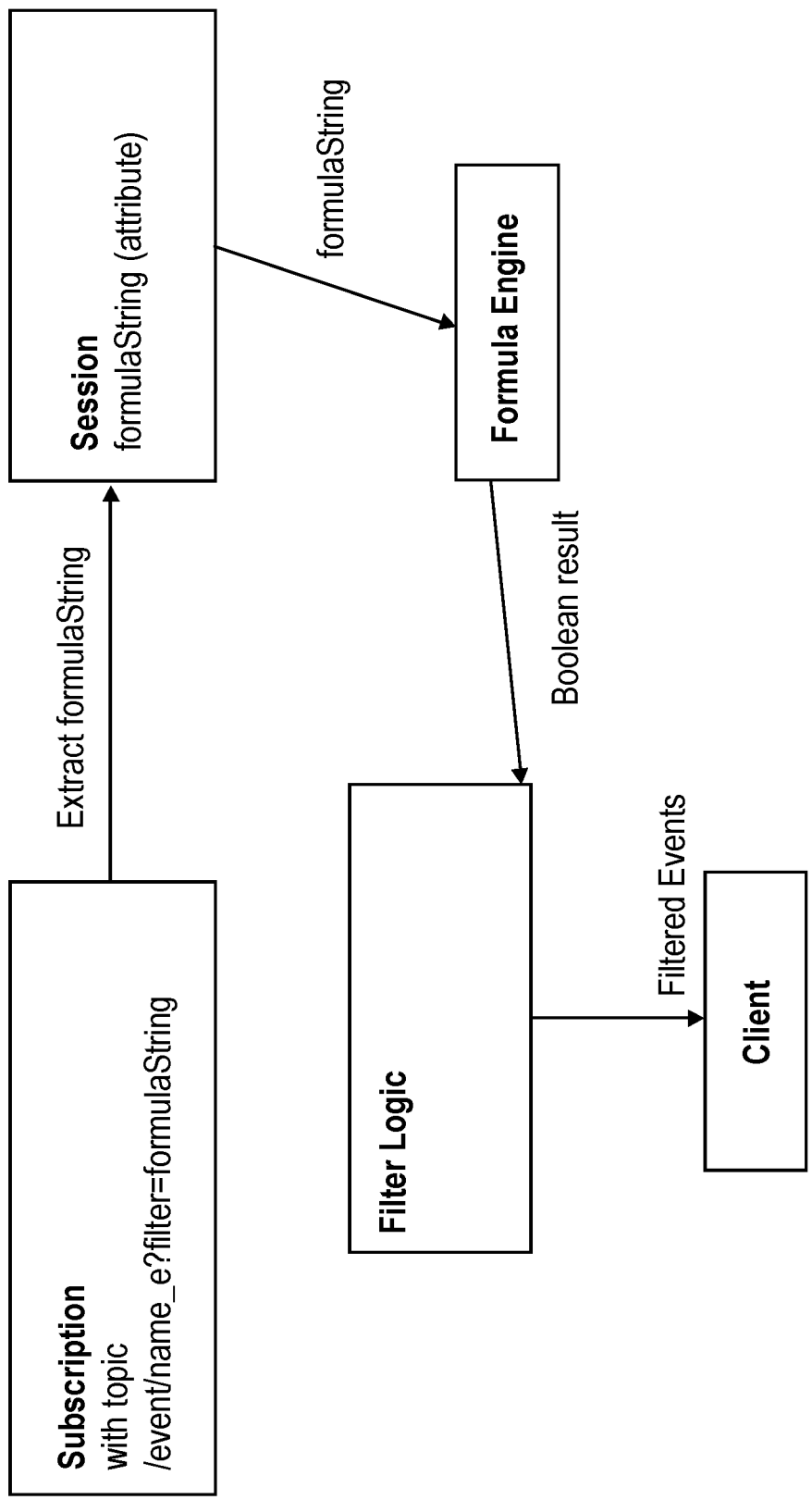
FIG. 3 is a diagram of an example implementation of subscription registration and event filtering.

FIG. 3 is a diagram of an example implementation of subscription registration and event filtering. The process illustrated can be implemented as part of a subscription manager, event delivery manager, or other component of an event recordation and delivery system. As illustrated, the process starts with accepting a filter at subscription time that makes it possible to have specific filter for each subscription. When an event consumer subscribes to an event stream (e.g., a platform event topic or a change data capture topic), the event consumer can provide a filter string with the format of fieldName and value pairs separated with operators, e.g. Location_c="SF"&&Number_c=1. This filter string is appended to the topic name after a question mark, e.g. /event/HVPE_e?Location_c="SF"&&Number_c=1. This means the event consumers is expecting to get the events that match the criteria that the value of Location_c field is 'SF' and the value of Number_c field is 1. Only events that match this criteria should be delivered to the event consumer.

In some implementations, event consumers can be responsible to ensure the filter they provided is valid, namely that the filter respects the expression language, the fieldName in the filter respects the event schema, the value of the field matches the field data type, and similar requirements. Otherwise the subscription the will fail in this example implementation. The subscription manager processes the received filter string by extracting it from the user provided topic name. The subscription manager applies various validations to the filter. If the filter is valid, the subscription manager will accept the subscription and the filter string will be stored in the server session in a map. In this way different subscriptions in the same session will have their own filter.

When events are published for an event stream (e.g., a platform event or change data capture channel), if the subscription manager observes the subscription to that channel contains a filter then the filtering logic is applied. The filtering logic will be applied during event delivery at the server side. The payload of the event can first be converted to a standard EntityObject based on the schema footprint. For the two payload format supported, a compact format and expanded format, this conversion can be done directly for the expanded format. For a compact format, the binary payload is deserialized first and then converted to an EntityObject.

The converted EntityObjects and the filter string stored in the server session are passed into the formula engine. The formula engine will then determine if the EntityObject matches the filter or not. The formula engine is responsible for recognizing the expression language defined at subscription time, parsing the filter string passed in during subscription time into tokens, and evaluating the event based on the tokens and combination operators, to return the evaluation result.

To satisfy the above functionalities a formula engine can be used with features such as supporting taking a filter string and an EntityObject and returning a boolean as an evaluation result, supporting various operators and functions. Event consumers can use formula editor from setup to validate input formula string. The formula engine can execute filters in 1 ms for complicated formula evaluation on average.

Different cases of filter validation results during subscription can be encountered. If in the same session, an event consumer already subscribed to a topic with a filter, then try to subscribe to the same channel with a different filter, or the subscription fails. If the filter is malformed (e.g. ?Location_c=&&Number_c=1), then the subscription fails. If the filter data type does not match value (e.g. ?Number_c='Test'), then the subscription fails. If the filter contains fields, but not a Number or String to define criteria for the filter, then the subscription fails. If the filter contains a field that does not exist in the event schema, then the subscription fails. If the event consumer requests to filter a topic that is not permitted to be filtered, then the subscription fails.

In some implementations, metrics and logging are collected both at subscription time and event delivery time to support diagnostics and management of the event recordation and distribution system. If a filter expression was supplied during subscription registration, whether or not the filter is valid then the filter information can be logged. At event delivery. The total number of events delivered is tracked via a counter per batch and per app server, the total number of events filtered out is tracked via a counter per batch and per app server, the amount of time it takes to evaluate filters for events is tracked via a histogram per batch and per app server.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 4A:
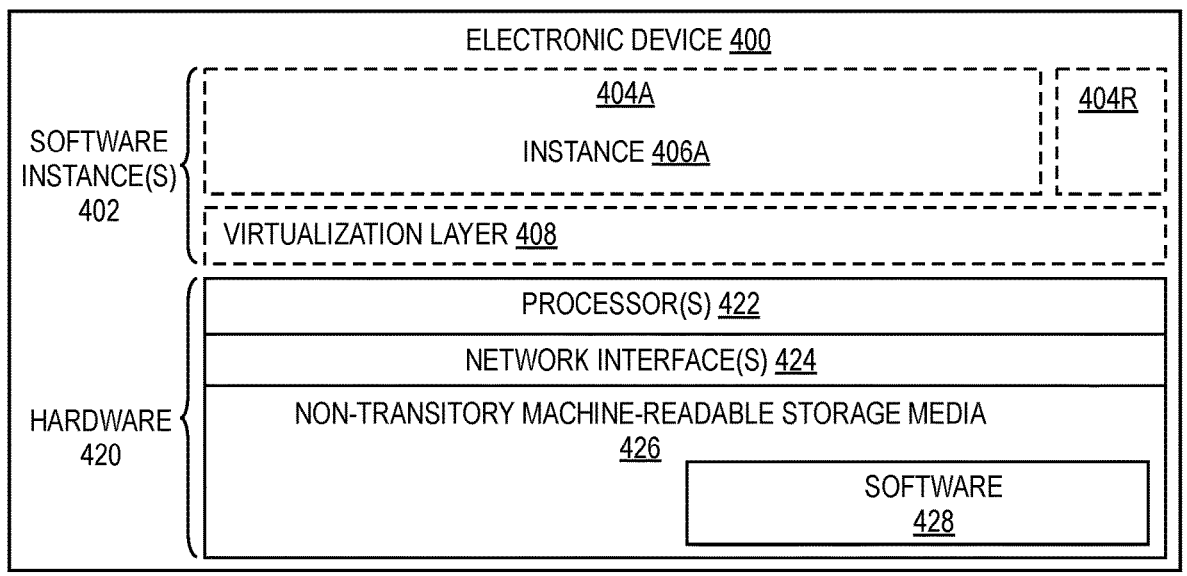
FIG. 4A is a block diagram illustrating an electronic device, in accordance with some implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and non-transitory machine-readable storage media 426 having stored therein software 428 (which includes instructions executable by the set of one or more processor(s) 422). Each of the previously described subscriber management functions and the event recordation and delivery system may be implemented in one or more electronic devices 400. In one implementation: 1) each of the event consumer/producer systems is implemented in a separate one of the electronic devices 400 (e.g., in electronic devices where the software 428 represents the software to implement event consumer/producers to interface with the event recordation and distribution system (e.g., a web browser, a native client, a portal, a command-line interface, and/or an application program interface (API) based upon protocols such as Simple Object Access Protocol (SOAP), Representational State Transfer (REST), etc.)); 2) the event recordation and distribution is implemented in a separate set of one or more of the electronic devices 400 (e.g., a set of one or more server electronic devices where the software 428 represents the software to implement the event recordation and distribution system); and 3) in operation, the electronic devices implementing the event producers/consumers and the event recordation and distribution system would be communicatively coupled (e.g., by a network) and would establish between them (or through one or more other layers) connections for submitting events to the event recordation and distribution system and returning events to event consumers. Other configurations of electronic devices may be used in other implementations (e.g., an implementation in which the event producer/consumers and the event recordation and distribution system are implemented on a single electronic device 400).

In electronic devices that use compute virtualization, the set of one or more processor(s) 422 typically execute software to instantiate a virtualization layer 408 and software container(s) 404A-R (e.g., with operating system-level virtualization, the virtualization layer 408 represents the kernel of an operating system (or a shim executing on a base operating system) that allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 428 (illustrated as instance 406A) is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 4B:
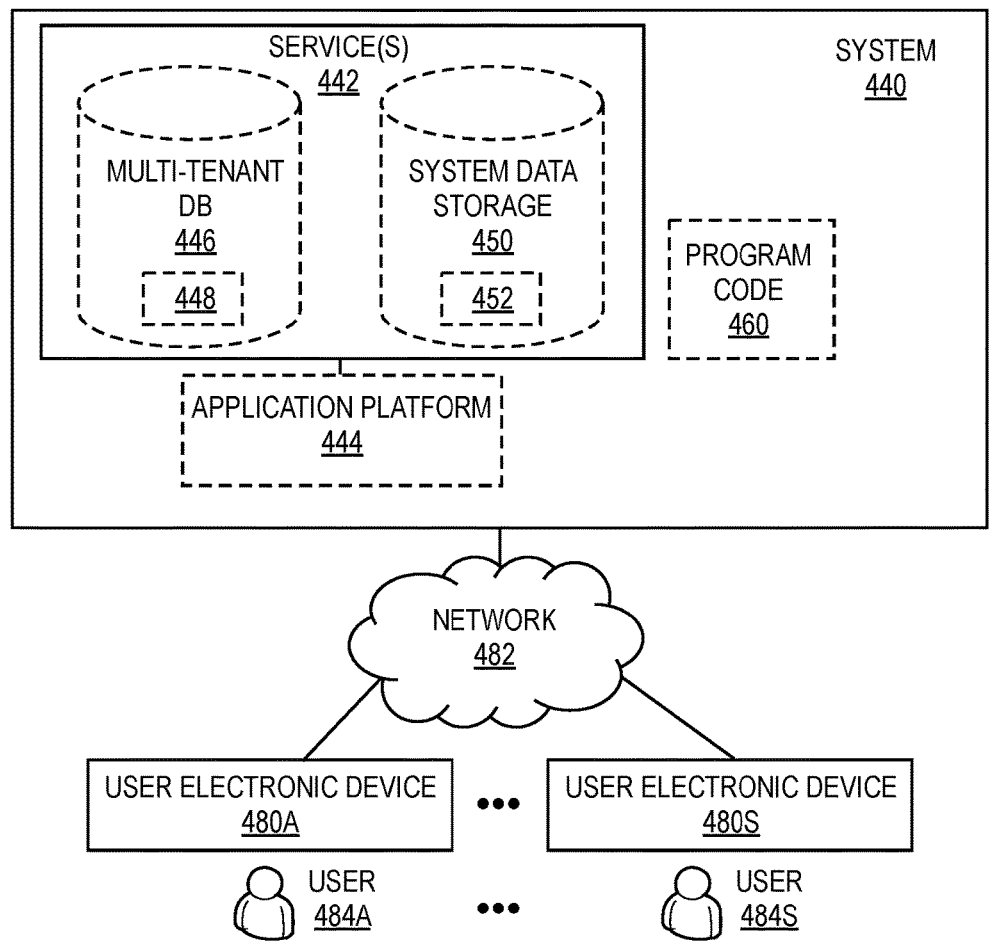
FIG. 4B is a block diagram of an environment where a mechanism for event delivery may be deployed, in accordance with some implementations.

FIG. 4B is a block diagram of an environment where content based filtering in an event recordation and distribution system may be deployed, according to some implementations. A system 440 includes hardware (a set of one or more electronic devices) and software to provide service(s) 442, including the content based filtering. The system 440 is coupled to user electronic devices 480A-S over a network 482. The service(s) 442 may be on-demand services that are made available to one or more of the users 484A-S working for one or more other organizations (sometimes referred to as outside users) so that those organizations do not need to necessarily be concerned with building and/or maintaining a system, but instead makes use of the service(s) 442 when needed (e.g., on the demand of the users 484A-S). The service(s) 442 may communication with each other and/or with one or more of the user electronic devices 480A-S via one or more Application Programming Interface(s) (APIs) (e.g., a Representational State Transfer (REST) API). The user electronic devices 480A-S are operated by users 484A-S.

In one implementation, the system 440 is a multi-tenant cloud computing architecture supporting multiple services, such as an event recordation and distribution system, a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 440 may include an application platform 444 that enables PAAS for creating, managing, and executing one or more applications developed by the provider of the application platform 444, users accessing the system 440 via one or more of user electronic devices 480A-S, or third-party application developers accessing the system 440 via one or more of user electronic devices 480A-S.

In some implementations, one or more of the service(s) 442 may utilize one or more multi-tenant databases 446 for tenant data 448, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user electronic device 480A-S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the one or more multi-tenant database 446 and/or system data storage 450.

In some implementations, the service(s) 442 are implemented using virtual applications dynamically created at run time responsive to queries from the user electronic devices 480A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the content bases filtering service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 440 and the user electronic devices 480A-S.

Each user electronic device 480A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 440. For example, the user interface device can be used to access data and applications hosted by system 440, and to perform searches on stored data, and otherwise allow a user 484 to interact with various GUI pages that may be presented to a user 484. User electronic devices 480A-S might communicate with system 440 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 480A-S might include an HTTP client, commonly referred to as a "browser," for sending and receiving HTTP messages to and from server(s) of system 440, thus allowing users 484 of the user electronic device 480A-S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method, comprising:
    processing a subscription request received from an event consumer system, the subscription request indicating a particular topic;
    determining an event stream associated with the subscription request;
    determining whether the subscription request has specified has associated content based filter logic, the content based filter logic indicating criteria for which events of the event stream are to be delivered to the event consumer system;
    determining whether the content based filter logic is valid based, at least in part, by:
        verifying, for at least a first field of the content based filter logic, presence of a corresponding value in the content based filter logic, and
        verifying that a data type of the value is compatible with the first field;
    responsive to determining that the content based filter logic is valid, registering, for the event stream, the subscription request and the associated content based filter logic;
    obtaining an event received from an event recordation and distribution system;
    determining an event stream associated with the event;
    determining one or more subscriptions for the determined event stream;
    determining, for at least one subscription of the subscriptions, whether the subscription has associated content based filter logic;
    responsive to determining that the subscription has associated content based filter logic, determining whether the event satisfies the content based filter logic based, at least in part, on a value of a first field of a data object corresponding to the event; and
    providing the event to the event consumer system in response to determining that the event satisfies the content based filter logic.

2. The method of claim 1, further comprising:
    determining the content based filter logic for each subscription request submitted for the event stream.

3. The method of claim 1, further comprising:
    interpreting the content based filter logic by a formula engine of the event recordation and distribution system.

4. The method of claim 1, further comprising:
    establishing a subscription for the event consumer system, the subscription including the content based filter logic of the subscription request.

5. The method of claim 1, further comprising:
    processing a second subscription request for a second event stream; and
    responsive to determining that validating of second content based filter logic specified in association with the second subscription request for the second event stream, has failed, registering the second subscription request without the second content based filter logic.

6. A computer program product comprising a non-transitory machine-readable storage medium having computer program instructions stored therein, the computer program instructions configured such that, when executed by one or more processors, the computer program instructions cause the one or more processors to:
    process a subscription request received from an event consumer system, the subscription request indicating a particular topic;

determine an event stream associated with the subscription request;
determine whether the subscription request has associated content based filter logic, the content based filter logic indicating criteria for which events of the event stream are to be delivered to the event consumer system;
determine whether the content based filter logic is valid based, at least in part, by:
   verifying, for at least a first field of the content based filter logic, presence of a corresponding value in the content based filter logic, and
   verifying that a data type of the value is compatible with the first field;
responsive to determining that the content based filter logic is valid, register, for the event stream, the subscription request and the associated content based filter logic;
obtain an event received from an event recordation and distribution system;
determine an event stream associated with the event;
determine one or more subscriptions for the determined event stream;
determine, for at least one subscription of the subscriptions, whether the subscription has associated content based filter logic;
responsive to determining that the subscription has associated content based filter logic, determine whether the event satisfies the content based filter logic based, at least in part, on a value of a first field of a data object corresponding to the event; and
provide the event to the event consumer system in response to determining that the event satisfies the content based filter logic.

7. The computer program product of claim 6, wherein the computer program instructions are further configured to cause the one or more processors to:
   determine the content based filter logic for each subscription request submitted for the event stream.

8. The computer program product of claim 6, wherein the computer program instructions are further configured to cause the one or more processors to:
   interpret the content based filter logic by a formula engine of the event recordation and distribution system.

9. The computer program product of claim 6, wherein the computer program instructions are further configured to cause the one or more processors to:
   process a second subscription request for a second event stream; and
   in response to determining that validating of second content based filter logic specified in association with the second subscription request for the second event stream has failed, registering the second subscription request without the second content based filter logic.

10. A system, comprising:
a database system implemented using a server system, the database system configurable to cause:
   processing a subscription request received from an event consumer system, the subscription request indicating a particular topic;
   determining an event stream associated with the subscription request;
   determining whether the subscription request has associated content based filter logic, the content based filter logic indicating criteria for which events of the event stream are to be delivered to the event consumer system;
   determining whether the content based filter logic is valid based, at least in part, by:
      verifying, for at least a first field of the content based filter logic, presence of a corresponding value in the content based filter logic, and
      verifying that a data type of the value is compatible with the first field;
   responsive to determining that the content based filter logic is valid, registering, for the event stream, the subscription request and the associated content based filter logic;
   obtaining an event received from an event recordation and distribution system;
   determining an event stream associated with the event;
   determining one or more subscriptions for the determined event stream;
   determining, for at least one subscription of the subscriptions, whether the subscription has associated content based filter logic;
   responsive to determining that the subscription has associated content based filter logic, determining whether the event satisfies the content based filter logic based, at least in part, on a value of a first field of a data object corresponding to the event; and
   providing the event to the event consumer system in response to determining that the event satisfies the content based filter logic.

11. The system of claim 10, the database system further configurable to cause:
   interpreting the content based filter logic by a formula engine of the event recordation and distribution system.

12. The system of claim 10, the database system further configurable to cause:
   processing a second subscription request for a second event stream; and
   responsive to determining that validating of second content based filter logic specified in association with the second subscription request for the second event stream has failed, registering the second subscription request without the second content based filter logic.

13. The method of claim 1, the content based filter logic comprising a string that includes the at least one operator, the method further comprising:
   parsing the string such that a plurality of tokens are obtained;
   wherein determining that the event associated with the event stream satisfies the content based filter logic based, at least in part, on a value of the first field of a data object corresponding to the event includes evaluating the value of the first field of the data object using the tokens.

14. The method of claim 13, the string including at least one field name-value pair, the field name-value pair including a field name of the first field and a value, the field name and value being separated in the string by an operator.

15. The system of claim 10, the content based filter logic comprising at least one field name-value pair and a corresponding operator, the field name-value pair including a field name of the first field and a value.

16. The method of claim 1, wherein validating the content based filter logic submitted in association with the subscription request comprises applying one or more of: a syntactic algorithm or a semantic checking algorithm.

17. The method of claim 1, the event being obtained by an event delivery manager, wherein registering the subscription request and the associated content based filter logic comprises:

subscribing to the event stream by the event delivery manager with the event recordation and distribution system.

18. The method of claim 1, the subscription request being associated with a topic corresponding to the event stream.

19. The method of claim 1, wherein validating the content based filter logic submitted in association with the subscription request is performed comprises:
   verifying that the content based filter conforms to an expression language.

20. The method of claim 1, wherein validating the content based filter logic submitted in association with the subscription request is performed comprises one or more of:
   verifying that a field name of the content based filter respects an event schema, the field name corresponding to a field; or
   verifying that a value of the content based filter that corresponds to the field name matches a field data type associated with the field.

\* \* \* \* \*